United States Patent
Rosen

(10) Patent No.: US 9,022,054 B2
(45) Date of Patent: May 5, 2015

(54) MAINTENANCE DEVICE AND METHOD FOR PRODUCING A MAINTENANCE ACCESS

(75) Inventor: Hermann Rosen, Kastanienbaum (CH)

(73) Assignee: Rosen Swiss AG, Stans (CH)

( * ) Notice: Subject to any disclaimer, the term of this patent is extended or adjusted under 35 U.S.C. 154(b) by 886 days.

(21) Appl. No.: 13/131,271

(22) PCT Filed: Nov. 23, 2009

(86) PCT No.: PCT/EP2009/008324
§ 371 (c)(1),
(2), (4) Date: Jul. 11, 2011

(87) PCT Pub. No.: WO2010/060586
PCT Pub. Date: Jun. 3, 2010

(65) Prior Publication Data
US 2011/0259589 A1    Oct. 27, 2011

(30) Foreign Application Priority Data
Nov. 26, 2008   (DE) .................. 10 2008 059 062

(51) Int. Cl.
| F16L 41/06 | (2006.01) |
| B23D 45/12 | (2006.01) |
| B23C 3/00 | (2006.01) |
| B23D 59/00 | (2006.01) |
| F16L 55/168 | (2006.01) |

(52) U.S. Cl.
CPC .................. *B23D 45/12* (2013.01); *F16L 41/06* (2013.01); *B23C 3/00* (2013.01); *B23D 59/006* (2013.01); *F16L 55/168* (2013.01)

(58) Field of Classification Search
CPC ........................................ F16L 41/06
USPC .................... 137/317, 318, 15.13, 15.14
See application file for complete search history.

(56) References Cited

U.S. PATENT DOCUMENTS

| 5,924,436 A * | 7/1999 | Kitani et al. .................. 137/318 |
| 6,622,747 B2 * | 9/2003 | Sato et al. ..................... 137/318 |
| 2002/0007851 A1 | 1/2002 | Sato |

FOREIGN PATENT DOCUMENTS

| DE | 44 29 874 A1 | 2/1996 |
| EP | 0 935 089 | 8/1999 |
| JP | 56 083690 A | 7/1981 |
| JP | 2004 100951 A | 4/2004 |

* cited by examiner

Primary Examiner — Kevin Lee
(74) Attorney, Agent, or Firm — Gudrun E. Huckett

(57) ABSTRACT

The invention relates to a maintenance device for maintaining an elongated and in particular tubular hollow body (2), which is designed to conduct a fluid, having a sealing device (4) comprising a function unit (12), said sealing device being provided for sealing a working area (9) with respect to surroundings of the hollow body (2) and being movable in a direction along a surface of the hollow body (2), wherein the sealing device (4) comprising the function unit (12) can be moved at least partially in the longitudinal direction (B) of the hollow body (2), relative to the surface (7) of same, while preserving a tight seal. In addition, a method for forming a maintenance access on an elongated and in particular tubular hollow body is claimed.

27 Claims, 11 Drawing Sheets

MAINTENANCE DEVICE AND METHOD FOR PRODUCING A MAINTENANCE ACCESS

BACKGROUND OF THE INVENTION

The present invention relates to a maintenance device for performing maintenance on an elongated, and in particular tubular, hollow body which is designed to transport a fluid, having a sealing device which has a function-performing unit, which is intended to seal off a working region from the surroundings of the hollow body, and which can be moved in one direction along a surface of the hollow body. The invention also relates to a method of making a maintenance access for a hollow body as described above, and in particular for a pipeline for transporting gas, water or oil for example.

A device of the aforementioned kind is known from EP 0 935 089 B1. Described in this document are a device and a method for cutting into a pipeline in which a housing of a sealing device, which also comprises an adapter, is moved at right angles to the longitudinal extent of the pipeline and thus over the surface of the pipeline. The sealing device is seated on the pipeline with a seal. The housing, which has a function-performing unit which takes the form of a cutting tool, seals off from the surroundings of the pipeline the working space which is situated between the two parts of the adapter, which are removed from one another in the longitudinal direction. By opening or removing the housing, the working space or region becomes accessible. A cut is made by the function-performing unit during the movement. Then a gate valve is introduced into the pipeline through the region milled out by the tool in order for example to seal off the pipeline. With the device described, it is only short individual cuts which are made in a pipeline or circular openings matching the size of the boring or drilling tool. There are thus limits to the shape of an opening for maintenance access. For complete sections of a pipe to be removed, the device would have to be re-fitted, in which case the pipeline would have to be cut twice around its circumference. The region which had already been cut might be exposed when this was done, as a result of which a procedure of this kind cannot be performed, in the way which is often desirable, while a pipeline continues in operation. What is more, the pipeline might become unstable, because the maintenance device is not intended to make a complete cut in the pipeline.

It is an object of the present invention to provide a maintenance device and a method for making a maintenance access which are an improvement on the prior art.

SUMMARY OF THE INVENTION

This object is achieved by a maintenance device that is characterized in that the sealing device having the function-performing unit can be moved relative to the surface of the hollow body, at least partly in the longitudinal direction of the latter, and while a sealed connection is maintained, and is further achieved by a method of forming or making a maintenance access wherein, to make an opening, a function-performing unit which comprises a cutting tool acting on a wall of the hollow body has been moved, at least partly, in the longitudinal direction of the hollow body by means of a movement of the sealing device relative to a surface of the hollow body and cuts into a wall of the hollow body, the sealing device at the same time continuing to seal off the working region from the surroundings.

The maintenance device according to the invention is characterised in that the sealing device having the function-performing unit can be moved relative to the surface of the hollow body, at least partly, in the longitudinal direction of the latter, while a sealed connection is maintained. Instead of there being a movement in the circumferential direction of the pipeline, the pipeline can be provided with a considerably larger opening in its longitudinal direction. The size of damaged points which can be repaired, by milling them out for example, while at the same time the pipeline continues to operate, is thus considerably larger.

The sealing device is advantageously provided with an adapter which can be fitted to the hollow body with a seal, which has a surface facing away from the hollow body and which helps to forms a working region which serves to provide access to the hollow body. Hence, though the sealing device can be moved along the pipeline while remaining sealed, it is not its entire surface adjacent the pipeline which is moved over the surface of the pipeline and instead the adapter can be fitted to the pipeline, while preserving a sealed connection between the device and the pipeline, and by means of its surface can form a surface in contact with the rest of the sealing device. Frictional losses are minimised in this way. What is meant by working region in this case is in particular the region in which action is taken on the wall of the pipeline with maintenance tools such as cutting, milling and measuring means and which, when the pipeline, or rather hollow body, has been opened, has to be sealed off from the surroundings.

What is particularly advantageous is an embodiment of the invention in which, as well as being moved in the longitudinal direction, the sealing device can also be moved in a second direction at right angles to this latter direction. The at least one function-performing unit, which in a simple embodiment is formed by the sealing device itself in the form of a cover, can be moved relative to the surface of the hollow body on which maintenance is to be performed in a two-dimensional pattern of movement. Along the hollow body, which is for example in the form of a pipeline, an oval, or almost rectangular, opening or one of some other shape can be made, for example by milling out mutually adjacent regions, while at the same time the sealing device continues to seal off the working region adjoining the wall of the hollow body from the surroundings of the hollow body and in particular from the side of the sealing device remote from the adapter. The sealing device itself thus performs a two-dimensional movement which, depending on the form which the function-performing unit takes, may simplify the maintenance of the hollow body. The working region, which extends over an area, may for example be made accessible from different edge regions depending on how far and to where the sealing device is displaced over the hollow body in the longitudinal and/or circumferential directions thereof. What are for example possible with the sealing device according to the invention are helical movements along the longitudinal extent of the hollow body Instead of the sealing device making the possible movement in the circumferential direction over a cylindrical circumferential surface, and in the direction precisely opposite therefrom, which is known from the prior art, the sealing device can also be moved in a direction at right angles to the said direction, or rather to both the said directions. A two-dimensional movement of this kind which takes place for example over the plane of a cylindrical circumferential surface can take place in the form of a movement along an oblique path in which two movements of the sealing device extending at right angles to one another are superimposed on one another, but it may also comprise a first movement, followed by a second movement which is at an angle of 90°.

A further advantage of the design according to the invention lies in the minimising, no longer in just one dimension but now in two dimensions, of the working region along and around the exterior of the hollow body to be maintained, which latter is not part of the maintenance device. Instead of the working region being enlarged, and then having to be sealed off again, to allow a lateral movement of the function-performing unit relative to the sealing device, the sealing device is moved too and the working region remains of the same size. Particularly in the case of a hollow body which has already been opened and in which fluids are continuing to be transported, the result is only a minimal effect on the flow in the hollow body. The working region can be kept small.

Although the elongated hollow body on which maintenance is to be performed by the maintenance device may be of comparatively random cross-sections or cross-sectional shapes, the maintenance device is particularly suitable for performing maintenance on pipelines or other pipes. To allow the embodiments of the invention which are described below to be explained, it will therefore be assumed that the hollow body is a pipeline. Individual refinements according to the invention may be particularly advantageous precisely in the case of outlines which are circular in cross-section or at least curved in a region or regions.

The adapter of the sealing device according to the invention may for example be screwed or welded onto a pipeline. For this purpose, it may have on its inner side additional sealing means such for example as rubber seals which assist in making or make a sealed connection to the pipeline.

In a refinement of the invention, the adapter is a profiled body which can be fitted onto the pipeline and whose interior adjacent the pipeline is approximately matched to the outer circumference of the pipeline and which is predominantly in the form of a tube or part-tube or flat ring, i.e. its thickness is small in comparison with its extent over an area along the sealing device or pipeline. This is particularly advantageous to enable the working region between the pipeline and the rest of the sealing device, which becomes larger as the adapter becomes increasingly thick, to be kept as shallow and hence small as possible. The shape of the adapter can be matched to the shape of the hollow body both on the inner side of the adapter and on the outer side of the adapter.

Particularly where the adapter has a curved surface facing away from the pipeline, a refinement of the invention is advantageous in which the maintenance device comprises a sealing device whose inner side facing towards the pipeline at least partly forms a curved surface. By this means, the sealing device is able to fit closely to the pipeline or be supported on it or, in an embodiment which has an adapter, to fit closely to the adapter or be supported on it, thus giving a sealed connection between the pipeline and the sealing device, by the use of further sealing means if required. Particularly when it is designed to have a shallow, curved adapter, the other parts of the sealing device may be matched to the adapter, at least in the region which is movable over the adapter and which can be moved over the working region when the function-performing unit is moved. In this way, the working region is kept as small as possible, which minimises the effect on the pipeline which has already been opened, because the shape of that side of the other parts of the sealing device which faces towards the pipeline can correspond to the region of the wall of the pipeline which has been removed and which is situated only a short distance away from its original position, provided the adapter is, as described above, thin in form.

What is also of advantage is a maintenance device in which the sealing device is, in essence in the form of tubes or part-tubes. As well as having the advantages described above relating to the small effect on a pipeline which is in operation, a maintenance access of this kind requires only a small amount of space. The maintenance device, which often has to be attached to pipelines laid in the ground, is small and unobtrusive in construction when it has a sealing device which is formed by one or more sliding tubes or part-tubes or which comprises at least one sliding tube or part-tube. What is meant by a sliding tube or part-tube in this case is, once again, a sealing device which extends predominantly over an area in the longitudinal and/or circumferential direction of the pipeline on which maintenance is to be performed, although what may also be referred to as sliding tubes or part-tubes are hollow cylindrical profiles extending round in a loop such for example as rings of quite a shallow form. Hence, what are referred to as "in the form of tubes or part-tubes" are curved surfaces of profiled bodies whose extent is greater—and preferably considerably greater—than their thickness at least in one direction over the surface of the pipeline. Thus, what is referred to as a sliding tube or part-tube is a profiled body which can be moved, at a curved surface, over, or in the extreme case directly against, the outside of the pipeline or the adapter.

Accordingly, the surface of the adapter too preferably takes the form of a surface for sliding movement to enable it, in combination with a sliding tube or part-tube or a similar profiled body belonging to the sealing device, to produce a maintenance device which is as shallow as possible and to enable further sealing means to be dispensed with. Thus, depending on the form taken by the maintenance device according to the invention, the sealing device slides either on the outside of the hollow body or on that side of the adapter which is adjacent the sliding parts of the sealing device.

The maintenance device according to the invention is also improved if the function-performing unit comprises a cutting device which is designed to make an opening in the hollow body. This latter operation can be performed by means of, for example, a milling head or a cutting head of some other design, what is meant by a cutting device thus being not only, and preferably, removal of regions of the wall of the hollow body by milling or cutting but also by other stock-removing processes. The making of an opening in the hollow body by means of the movement of the sealing device, particularly when the latter is in the form of, or is formed to have, a sliding tube or part-tube, once again results in a working region which is small in size and hence in flow in the pipeline which is only slightly affected. The cutting device, which is preferably substantially immobile relative to the sealing device in the direction in which the sealing device extends over an area, i.e. in the direction of the outside of the hollow body, is guided in the working region by the sealing device, as a result of which drive means for the cutting device to produce a movement in the surface do not have to be arranged in the region which is accessible to the fluid. Instead, what are sufficient for moving the cutting device in the surface of the outer wall of the pipe are, in accordance with the invention, drive means which are to be provided for moving the sealing device and which for example improve the manual movement of the sliding tube or part-tube which is made possible by one or more handles. Alternatively, the cutting device can of course be replaced or supplemented by other devices such for example as measuring units. The cutting of any desired cuts in the pipeline and not just circular or linear ones makes it possible for more adaptable maintenance accesses to be made while the pipeline remains in operation at the same time. Any adapters which are present can if required be partly removed from the function-performing unit as part of the process when a opening is made, in which case the device, which is a cutting or milling device for example, makes an opening both in the adapter and in the pipeline. The adapter thus (also) forms the working region.

Depending on the nature of the movement of the sealing device and the cutting device, an opening is made by, for example, milling away an outline. In this case the region which is cut out should then be removed from the pipeline. Alternatively or in addition, an opening can be made by removing mutually adjacent regions by milling them out. In this case it is merely the swarf which has to be removed from the pipeline, by a filter or a magnet for example. Alternatively, the swarf may for example also be floated out of the pipeline, which is generally at a pressure above atmospheric, through a passage through the function-performing unit which allows a defined exit of the medium.

The maintenance device according to the invention is advantageously refined if the adapter is in more than one part in a direction at right angles to the longitudinal extent of the hollow body and/or in the direction of the longitudinal extent thereof. A recess of this kind in more than one part, produced in particular by two portions which are in part-tube form and/or annular form and which are designed to be fitted onto a pipeline and which are arranged to be spaced away from the pipeline axially, increase the size of the working region of the device according to the invention as a result of greater adaptability.

Advantageously, the working region of the maintenance device may be formed at least partly by at least one aperture in the adapter. The region, through which it is for example possible for parts of a cutting device to pass, is able, because of the shape of the adapter, to be precisely matched to the maintenance operation which is to be carried out, which may make the region to be sealed off smaller and the maintenance device and the maintenance operation themselves safer and more reliable.

It may also be advantageous in accordance with the invention for the sealing device, together with the adapter or not, to be formed in more than one part. The sealing device then has a plurality of sliding tube or part-tube members which are able to guide the function-performing unit(s) by moving with one another and/or independently of one another. At the same time, the individual parts of the sealing device are able to expose the maintenance opening which has been made or which was already present by moving apart from one another. It is therefore advantageous for the maintenance device to be refined to the effect that parts of the sealing device are movable, in particular independently of one another, over the outside of the hollow body at least in two directions at right angles to one another. Alternatively however, the individual parts of the sealing device may also be coupled to one another in such a way that the movements of the other part or parts are coupled together, after the fashion of an iris diaphragm for example, or that the movement of one part causes any other parts which there may be to move with it.

What is understood by movement in this case is preferably a movement in the direction in which the surfaces for sliding movement, or the outside of the pipeline, extend over an area. What are also conceivable however are movements of the sealing device in a direction perpendicular to the movement in this plane, in order for example to being a cutting device into contact with the wall of the pipeline.

Where a maintenance device is in more than one part, individual parts of the sealing device are also advantageously provided with at least two connecting faces which face towards one another and are in particular optimised from the point of view of sealing, to enable them to be fixed to one another with a particularly good seal.

In a further advantageous refinement of the maintenance device according to the invention, the extent of the adapter in the longitudinal direction of the hollow body extends beyond the extent of the other parts of the sealing device. The sealing device can thus be driven by drive means which, looking in the longitudinal direction of the maintenance device, may be arranged between the adapter and for example a sliding tube or part-tube. In the case of an adapter which is for example welded to the pipeline, the drive means are supported on the adapter. An amount by which the adapter extends beyond the sealing device when the latter is in the closed position preferably corresponds to whatever is the extent of the opening in this direction. The adapter is thus also able to provide adequate surfaces for sliding movement to expose the opening.

The maintenance device preferably has at least one magnetic gripping device. Parts of the pipeline which are to be cut out, or swarf, for example, can be prevented from dropping into the pipeline. The magnetic gripping device is preferably part of the sealing device so that it can be moved with the latter in the appropriate way.

For a maintenance operation in which the pipeline has to be completely severed, it may be advantageous for the maintenance device to have a frame to stabilise the hollow body, which frame extends along the sealing device. This frame may be fastened directly to the sealing device or may be so designed that it can be fitted to the pipeline next to an adapter if there is one.

The operation and monitoring of the arrangement according to the invention is also improved if the maintenance device comprises sensors for detecting the position of the sealing device, which sensors may, what is more, advantageously be interrogated by appropriate means of communication in particular from a remote point and the information from them may be displayed or indicated by means of associated display or indicating means.

The above object is also achieved by a method of forming a maintenance access in an elongated, and in particular tubular, hollow body which is designed to transport a fluid, in particular by using a maintenance device according to the present invention, a sealing device which has in particular an adapter being matched to the shape of the exterior of the hollow body and being mounted thereon with a seal, the sealing device being so designed and mounted that a working region for making an opening in the pipeline is formed, which working region is sealed off by the sealing device from the surroundings of the hollow body, the sealing device, which is provided with a function-performing unit, being able to be moved along the hollow body in one direction, the method being characterised in that, to make an opening, a function-performing unit which comprises a cutting tool acting on a wall of the hollow body is moved, at least partly, in the longitudinal direction of the hollow body by means of a movement of the sealing device relative to a surface of the hollow body and cuts into a wall of the hollow body, the sealing device at the same time continuing to seal off the working region from the surroundings. By this method, the maintenance of a pipeline, and in particular the opening of the wall of the pipeline, can be made more convenient in ongoing operation, because the drive means required to move the cutting device in the plane no longer come into contact with the fluid and the effect on the flow can, as described above, be kept as small as possible. Long cuts can be made in the longitudinal direction of the pipeline, which may simplify maintenance operations if a seal is made at the same time.

In a further embodiment of the method, it is advantageous, for an opening to be made in the hollow body, for the cutting tool to be able to be moved by means of the sealing device in the longitudinal direction of the hollow body and also at right angles to this direction and, as a result of this and particularly in the case of a sealing device which, if suitably curved, takes the form of a sliding tube or part-tube, for it the cutting tool to perform a movement over a cylindrical circumferential surface. Almost any desired two-dimensional shapes of opening can be produced, with a sealed connection, by means of appropriate drive and, if required, control means. By displacing and moving the function-performing unit, these may also be three-dimensional patterns in which for example a part of the wall is not cut through but is ground away.

In a further method step according to the invention, it may prove advantageous for the movement of the cutting device to be performed, in succession, first in one direction and then in a direction at right angles to the first direction.

The method according to the invention is also improved if a plurality of discrete openings or a plurality of openings which are later to be combined are made in the wall of the pipeline by displacing sealing parts of the sealing device in the same working region without re-positioning the adapter or adapters. This may for example make good sense for the simultaneous introduction of a plurality of maintenance or measuring instruments.

Advantageously, looking from a side of the sliding tube or part-tube remote from the adapter, the working region may be exposed by displacing the sealing device along the adapter, only a small amount of space being required for the members in tube or part-tube form of the sealing device which are matched to the curvature of the pipeline.

As a particular preference, the opening becomes accessible as a result of individual parts of the sealing device, which is in more than one part, being moved apart, thus enabling access to the pipeline to take place from the centre of the opening and/or the nature of the opening to be controlled in a more variable way.

A refinement of the maintenance device according to the invention is also provided with a sealing device having a replaceable seal. The said seal is preferably accessible from the exterior and enables a change to be made while the pipeline is operating without there being any major losses of the medium in the pipeline.

As well as this, it may also be advantageous for the maintenance device to be provided with a gate valve which is to be associated with the sealing device and which enables at least part of the function-performing unit to be changed. On completion of the maintenance work, the maintenance device may be provided with an outer enclosure which ensures that it is safe and protects it for the purpose of re-installation.

BRIEF DESCRIPTION OF THE DRAWINGS

Further advantages and details of the invention can be seen from the following description of the drawings. In the drawings, which are schematic.

Figure 1:
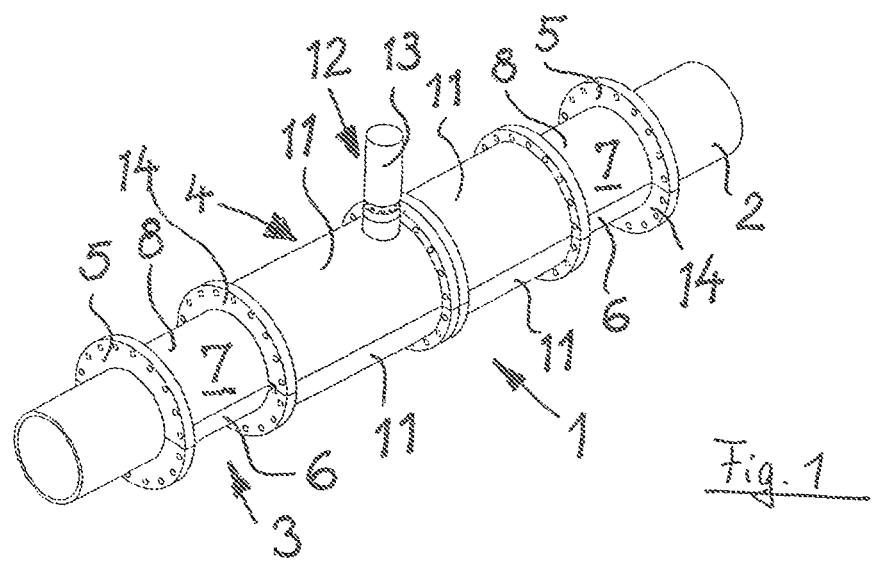
FIG. 1 is a perspective view of an article according to the invention.

Where this is helpful, parts which act in the same or a similar way have been given the same reference numerals. Individual technical features of the embodiments described below may also result in refinements in accordance with the invention when combined with features of the embodiments described above.

DESCRIPTION OF PREFERRED EMBODIMENTS

Shown in FIG. 1 is a maintenance device 1 according to the invention which has already been arranged on a hollow body 2 in the form of a pipeline which is not part of the invention. The maintenance device comprises an adapter 3 in more than one part, having outer fastening flanges 5, which adapter 3 is part of a sealing device 4 in more than one part.

Figure 3:
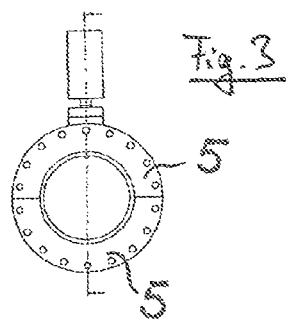
FIG. 3 is a longitudinal section through the article shown in FIG. 1.

The adapter 3 comprises a part 6, which is at the bottom in FIG. 1, which is similar to a hollow half-cylinder. This latter is matched in shape to the pipeline 2 on which maintenance is to be performed and is preferably fastened thereto, being for example welded thereto. That surface 7 of the adapter 3 which faces away from the pipeline 2 takes the form of a surface for sliding movement for the other parts of the sealing device 4. In the embodiment which is shown the pipeline is completely surrounded (see FIG. 3).

Figure 8:
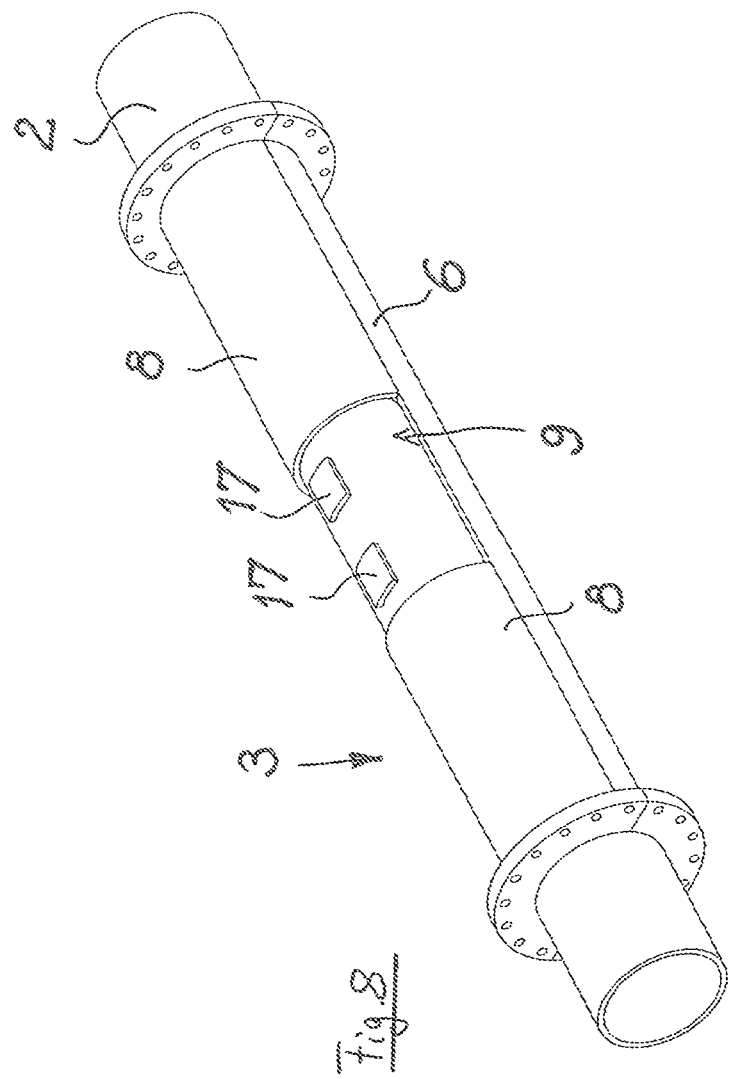
FIG. 8 is a view of part of the article shown in FIG. 1.

As can be seen from FIG. 8, the adapter 3 has two upper parts 8 which are arranged at a distance from one another, whereas the lower part 6 is in one piece. Together, the part 6 and the parts 8 form a working region 9 which can be sealed off from the surroundings by the sealing device 4 and which is so sealed off in FIG. 1.

The sealing device 4 itself comprises four sliding part-tubes 11, which in essence take the form of half-cylinders and which are able to slide over the surface 7 by their inner faces, which are not visible in FIG. 1. If required, sealing means may be arranged at the two surfaces for sliding movement to improve the sealing of the working region.

Figure 2:
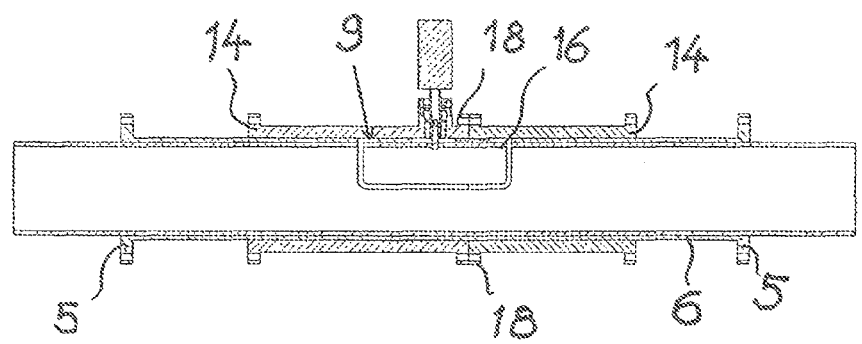
FIG. 2 is a longitudinal section through the article shown in FIG. 1

As a function-performing unit 12, the sealing device 4 comprises a cutting device having a motor arranged in a housing 13, which may for example be an electric motor or a hydraulic motor. The function-performing unit can be moved by the sealing device 4. In FIG. 2 can be seen, in a longitudinal section, the way in which the cutting device has been guided by the sealing device to make an opening in the wall of the pipe.

The four parts 11 in tube or part-tube form of the sealing device 4 are likewise provided, on the outer ends, with fastening flanges 14. Drive means to move the sealing device in the axial and circumferential directions may for example be provided between the flanges 5 and 14.

It can be seen from FIG. 2 in particular that the working region 9 is kept very small, as a result of which the cross-section of the pipeline remains almost unchanged even after a possible removal of the part 16 of the wall which has been cut out. The part 16 of the wall is prevented from dropping into the pipeline by magnetic gripping devices 17 which can be seen more clearly in FIG. 8. The flow in the pipeline is disrupted to only a very small extent.

The two parts 11 of the sealing device 4 which are on the left and right in the Figure can be fixed to one another by means of fastening flanges 18. To allow them to be securely fixed once maintenance has taken place, the two hollow cylinders may for example be bolted to one another.

Figure 4:
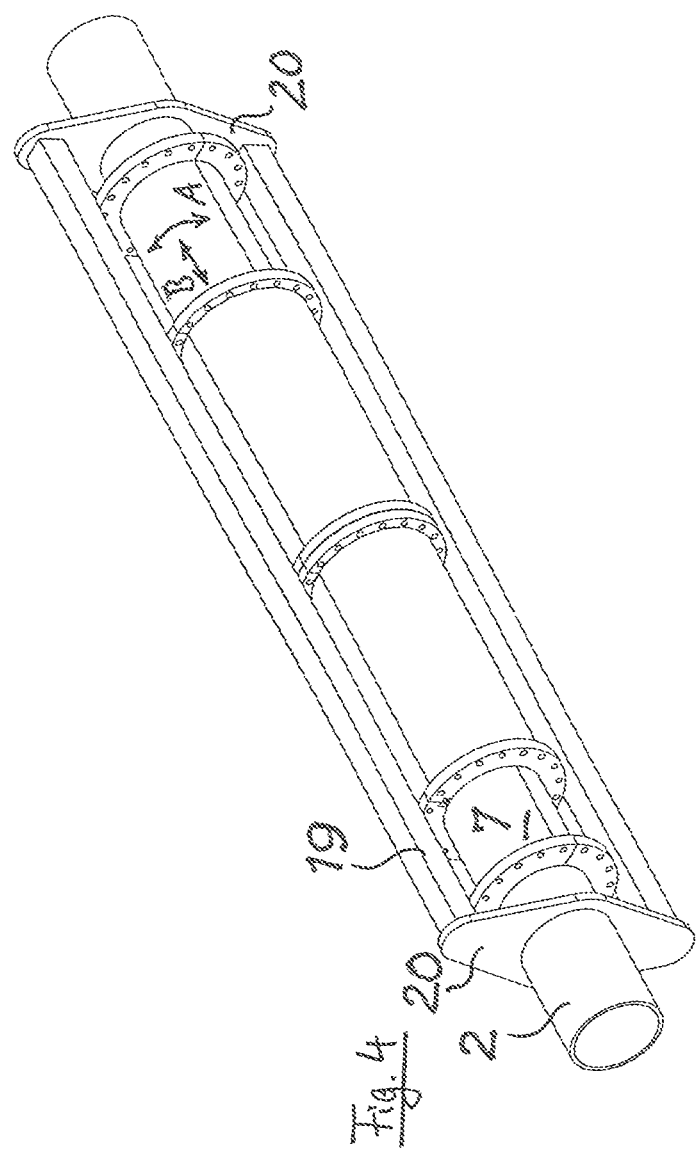
FIG. 4 is a perspective view of a further article according to the invention.

Whereas the maintenance device shown in FIG. 2 is unable to cut through the pipeline around its entire circumference, the maintenance device according to the invention shown in FIG. 4 is designed to do precisely that. A frame to stabilise the pipeline 2 to an additional degree is welded onto the pipeline by means of flanges 20 and is part of the maintenance device 1.

Figure 5:
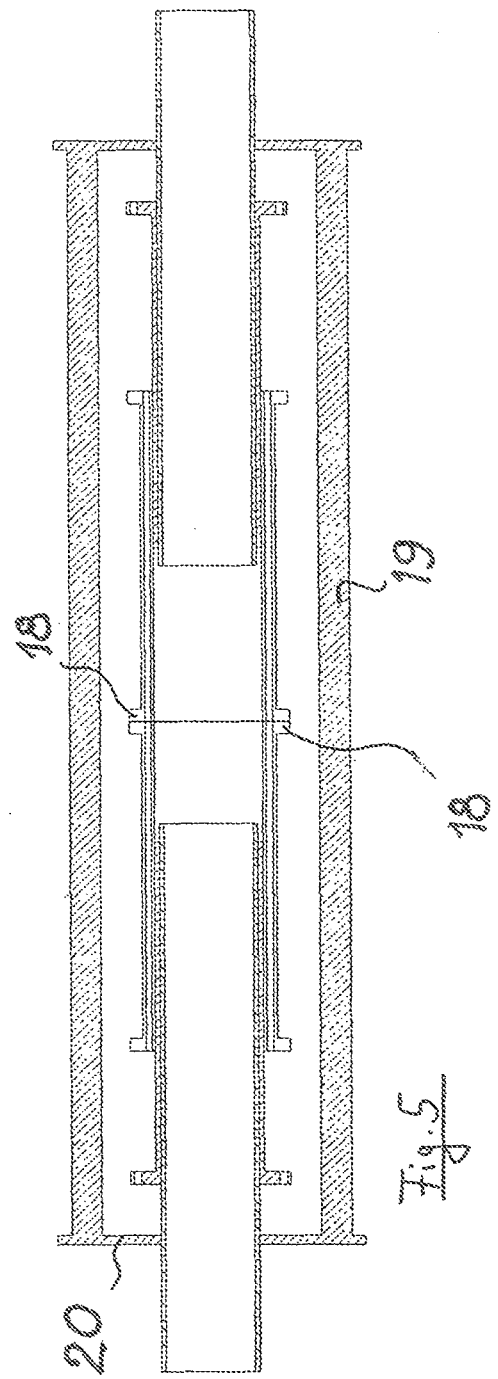
FIG. 5 is a longitudinal section through the article shown in FIG. 4.
Figure 6:
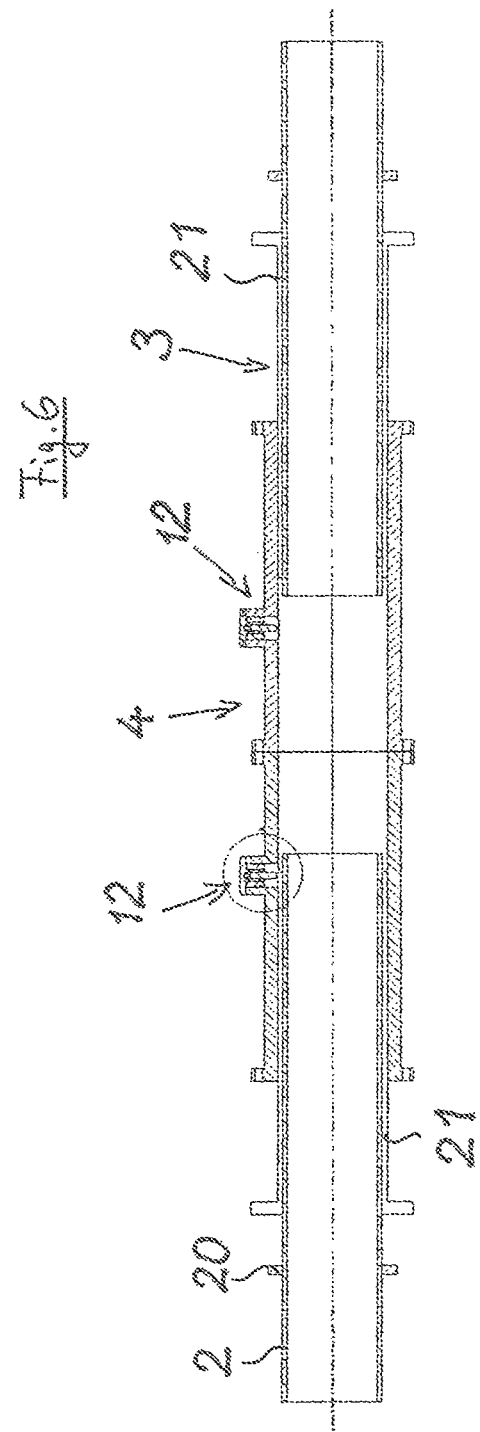
FIG. 6 is a view of the article shown in FIG. 4 which has been rotated through 90° from FIG. 5.
Figure 7:
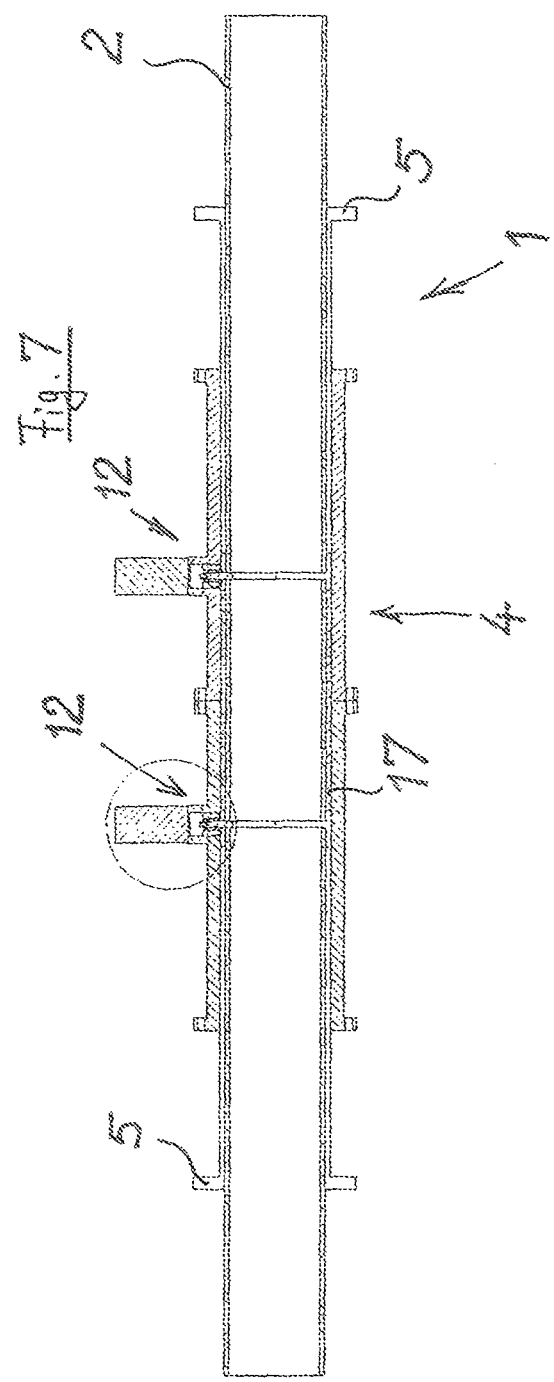
FIG. 7 shows a refinement of the article shown in FIG. 4.

Compared with the maintenance device shown in FIG. 1, the embodiment shown in FIG. 4 is provided with two function-performing units 12 in the form of cutting devices. Once the maintenance operation has been completed, part of the function-performing unit 12 can be removed, as indicated by the part of the motor housing which is missing in FIG. 6. As shown in FIGS. 4 to 6, the adapter is constructed from two hollow cylinders 21 which are each in two parts and which are arranged at a distance from one another in the axial direction of the pipeline 2.

The sealing device 4 is of similar construction to that shown in FIG. 2. Sliding tubes or part-tubes perform a movement through 360° on the surface for sliding movement 7 of the adapter 3 in the circumferential direction around the pipeline 2, as a result of which the pipeline is completely severed if the cutting tool is lowered.

Also, a magnetic gripping device 17 serves to hold the parts of the pipeline which have been cut out and to trap swarf. Once the pipeline has been cut through, the sealing device 4 can be opened around the flanges 18 to allow the portion which has been cut or the swarf to be taken out.

The movement of the sealing device 4 in a direction A around the circumference of the pipeline 2 or rather around the surface for sliding movement 7 of the adapter 3 is indicated in FIG. 4. In the plane of the surface 7, a direction at right angles to this direction corresponds to that indicated by the double-headed arrow B. The same is true of the opposite directions which are indicated by the double-headed arrows.

Figure 9:
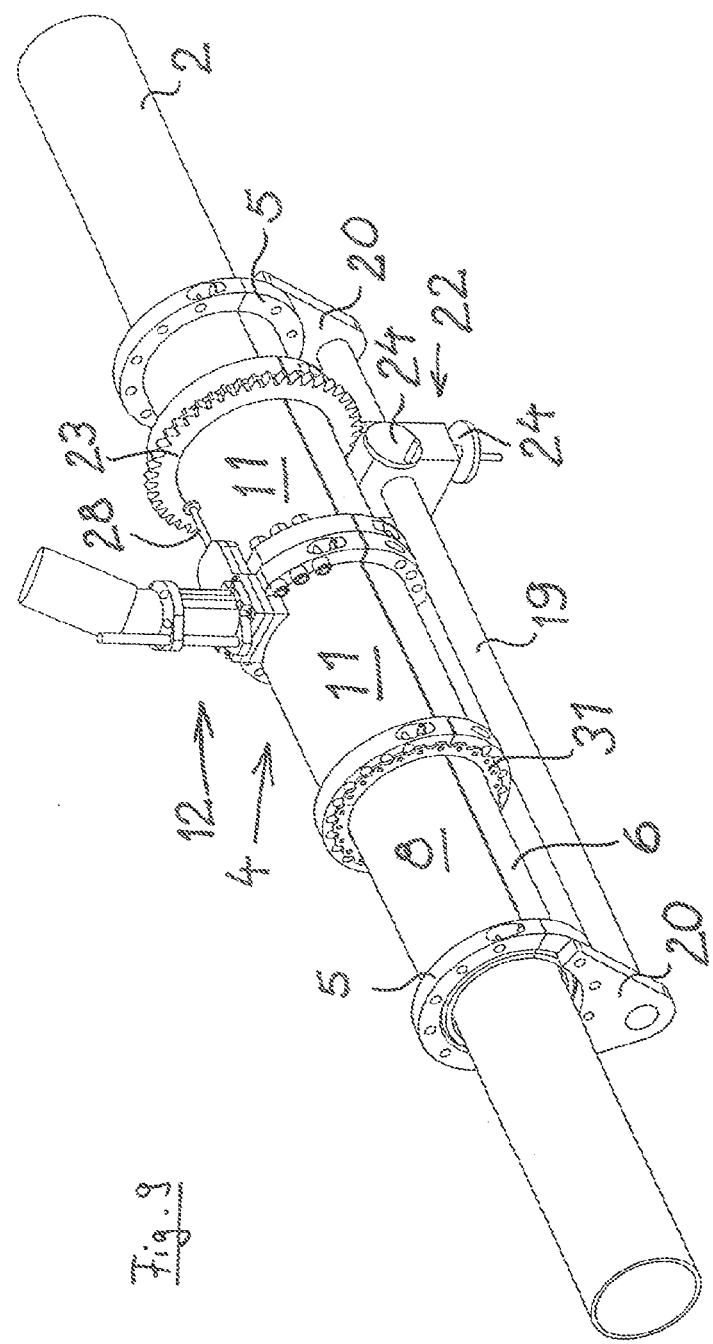
FIG. 9 is a perspective view of a further article according to the invention.
Figure 10:
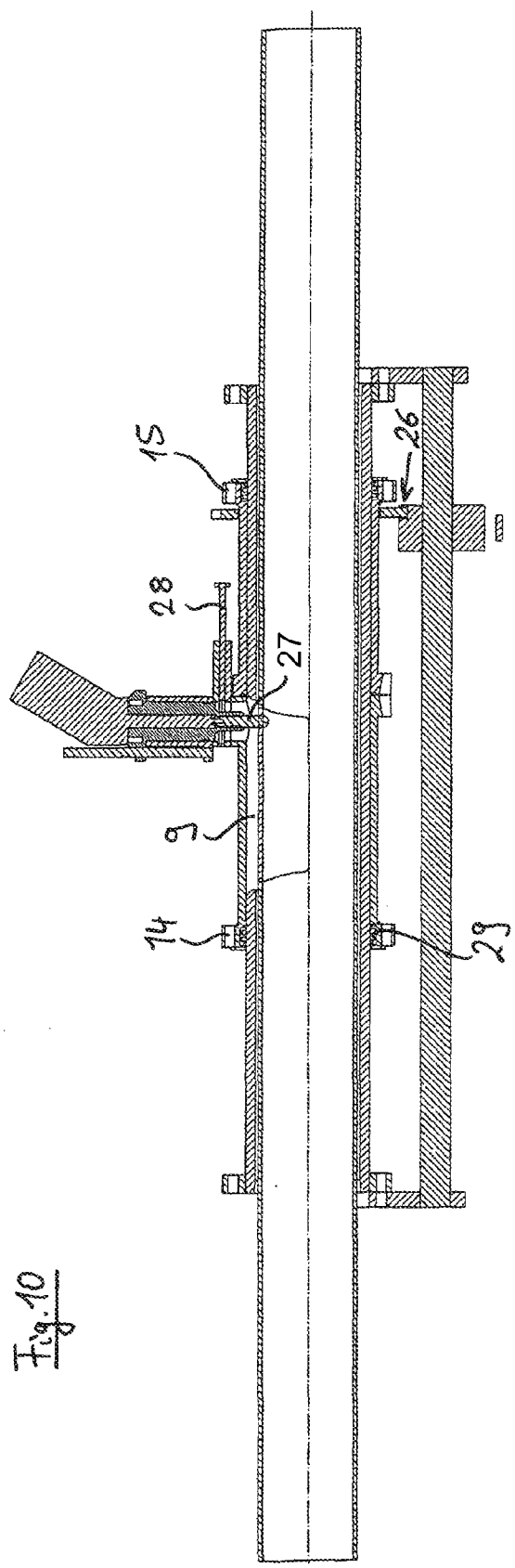
FIG. 10 is a longitudinal section through the article shown in FIG. 9.

A maintenance device which forms a further embodiment according to the invention is shown in FIG. 9 to have a function-performing unit 12, in the form of a cutting device, and a frame 19. The frame 19 is fastened to the fastening flanges 5 via its flanges 20. A drive means 22 serves to move the sealing device 4 in both the circumferential and longitudinal directions of the pipeline 2. For this purpose, the drive means 22 is provided with a groove 22 in which a ring gear 23 is mounted to be non-displaceable in the longitudinal direction but movable in the circumferential direction. Hand-cranks 24 can be used to operate the sealing device manually. It goes without saying that motorised means can be used too. By operating one of the hand cranks 24, the drive means 22 is caused to travel along the frame 19. By means of the gear which is guided in a groove 26, the sealing device 4 is moved as well via the drive means 22. By operating the other hand crank 24, the sealing device 4 is moved in the circumferential direction by means of the ring gear 23 (see also FIG. 10). To enable the milling head 27 to be replaced even during ongoing operation, the function-performing unit 12 could, on the one hand, be displaced to a region where there is no direct contact with the pipeline 2. Alternatively, once the milling head 27 has been withdrawn, a gate valve 28 can seal off the working region 9 from the external surroundings to an additional degree by being displaced in the direction of the longitudinal extent of the pipeline. The milling head 27 can then be taken out of the function-performing unit 12 without any direct contact being made between the space inside the pipeline and the surroundings.

To seal off the sliding tubes or part-tubes 11 from the upper and lower parts 6, 8 of the adapter, replaceable seals 29 may be provided particularly in the end regions of the sliding tubes or part-tubes 11. These seals 29 are arranged in the region of the outer flanges 14 to make a sealed connection between the parts 8, 6 and 11. Once the outer fasteners 31 which can be seen in FIG. 9 have been removed, these seals 29 can be removed and replaced even while the pipeline is still operating.

Figure 11:
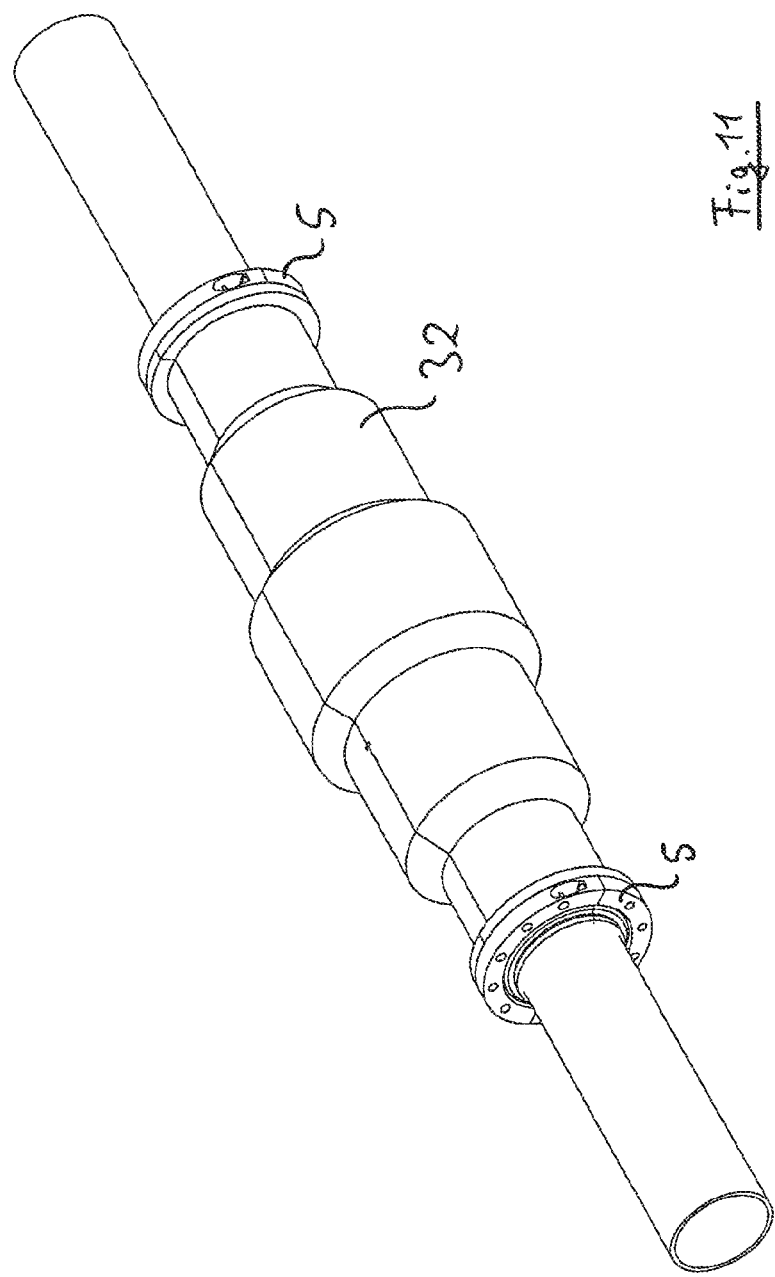
FIG. 11 is a perspective view of a further article according to the invention.
Figure 12:
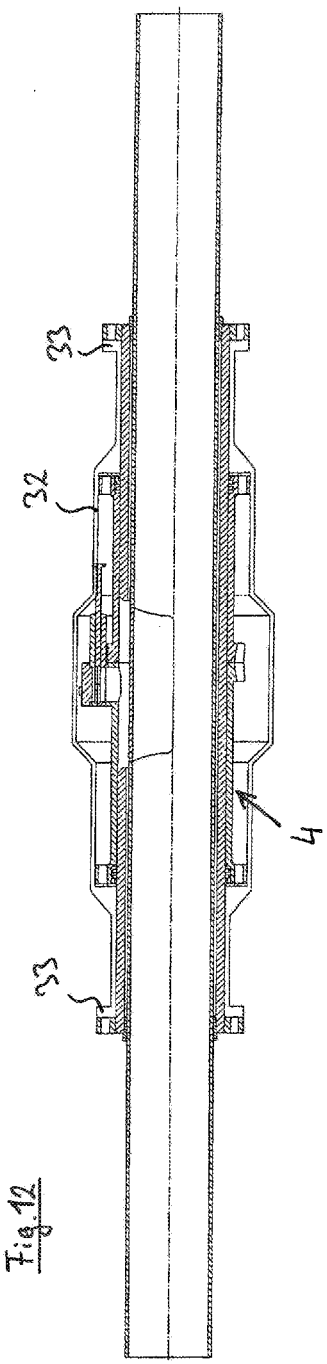
FIG. 12 is a longitudinal section through the article shown in FIG. 12.

On completion of the maintenance operation, the sealing device may be safeguarded with an outer enclosure 32 as shown by the maintenance device shown in FIGS. 11 and 12. The outer enclosure, which for example encloses the entire region in which the sealing device is situated between the outer flanges 5 and which for example is secured by, for example, lockable bolts, provides protection against unauthorised operation of the maintenance device in which access to, in particular, moving parts is prevented. As far as its shape is concerned, the outer enclosure 32 is therefore given a cross-section which, starting from the outer flanges 33, rises to the central point between the two flanges 33 and which is matched to the sealing device 4 which has to be enclosed.

The invention claimed is:

1. Maintenance device for performing maintenance on an elongated, tubular hollow body (2) which is adapted to transport a fluid, the maintenance device having a sealing device (4) which has a function-performing unit (12), which is adapted to seal off a working region (9) from surroundings of the hollow body (2), and which is adapted to move along a surface of the hollow body (2), wherein the sealing device (4) having the function-performing unit (12) is adapted to move relative to the surface (7) of the hollow body (2), at least partly, in the longitudinal direction (B) of the hollow body (2) while a sealed connection is maintained, wherein the sealing device (4) is adapted to move in a second direction (A) which extends at right angles to the first direction (B) such that the at least one function-performing unit (12) can be moved relative to a surface of the hollow body (2) on which maintenance is to be performed in a two-dimensional pattern of movement across the working region (9), while a sealed connection is maintained between the hollow body (2) and the sealing device (4).

2. Maintenance device according to claim 1, wherein the sealing device is provided with an adapter (3) which can be fitted to the hollow body (2) with a seal, which has a surface (7) facing away from the hollow body (2) and which partially forms the working region (9) which serves to provide access to the hollow body (2), a sealing part (11) of the sealing device being able to be moved along the adapter (3) while a sealed connection is maintained.

3. Maintenance device according to claim 2, wherein the surface (7) of the adapter (3) is adapted to form a surface for sliding movement.

4. Maintenance device according to claim 2, wherein the adapter (3) is in more than one part in a direction at right angles to a longitudinal extent of the hollow body (2) and/or in the direction of the longitudinal extent thereof.

5. Maintenance device according to claim 2, wherein the working region (9) is formed at least partly by at least one aperture in the adapter (3).

6. Maintenance device according to claim 3, wherein an extent of the adapter (3) in the longitudinal direction of the hollow body (3) extends beyond an extent of other parts (11) of the sealing device (4).

7. Maintenance device according to claim 1, wherein a lower side of the sealing device (4) which is adjacent the hollow body (2) on which maintenance is to be performed forms a curved surface.

8. Maintenance device according to claim 7, wherein the sealing device (4) has sliding members which are substantially in the form of part-tubes or tubes or hollow cylinders.

9. Maintenance device according to claim 1, wherein the function-performing unit (12) comprises a cutting device which is adapted to make an opening in the hollow body (2) by milling or a stock-removing process.

10. Maintenance device according to claim 1, wherein the sealing device (4) is in more than one part.

11. Maintenance device according to claim 10, wherein individual parts (11) of the sealing device (4) are movable, independently of one another, over the outside of the hollow body (2) on which maintenance is to be performed at least in two directions (A, B) which are at right angles to one another.

12. Maintenance device according to claim 10, wherein individual parts (11) of the sealing device (4) have at least two connecting faces which face towards one another.

13. Maintenance device according to claim 1, comprising a drive arrangement which enables the sealing device (4) to move in two dimensions.

14. Maintenance device according to claim 1, comprising at least one magnetic gripping device (17).

15. Maintenance device according to claim 1, comprising a frame (19) to stabilise the hollow body (2), which frame (19) extends along the sealing device (4).

16. Maintenance device according to claim 1, comprising sensors for detecting a position of the sealing device (4).

17. Maintenance device according to claim 2, for a hollow body (2) in the form of a pipeline, wherein the adapter (3) and a rest of the sealing device (4) are in the form of members, in the form of part-tubes or tubes or cylinders, which cover an area.

18. Maintenance device according to claim 1, wherein the sealing device (4) has a replaceable seal (29).

19. Maintenance device according to claim 1, wherein the sealing device (4) has a gate valve (28) which enables at least one part of the function-performing unit (12) to be changed.

20. Maintenance device according to claim 1, comprising an outer enclosure (32).

21. Method of forming a maintenance access on an elongated, tubular hollow body (2) which is adapted to transport a fluid, by using a maintenance device (1) according to claim 1, a sealing device (4) which has an adapter (3) being matched in shape to the exterior of the hollow body (2) and being mounted thereon with a seal, the sealing device (4) configured and mounted such that a working region (9) for making an opening in the hollow body (2) is formed, which working region (9) is sealed off by the sealing device (4) from surroundings of the hollow body (2), the sealing device (4), which is provided with a function-performing unit (12), being able to be moved along the hollow body (2) in one direction, wherein, to make an opening, a function-performing unit (12) which comprises a cutting tool acting on a wall of the hollow body (2) is moved, at least partly, in the longitudinal direction (B) of the hollow body (2) by a movement of the sealing device (4) relative to a surface of the hollow body (2) and cuts into a wall of the hollow body (2), the sealing device (4) at the same time continuing to seal off the working region (9) from the surroundings.

22. Method according to claim 21, wherein the sealing device (4) is moved in two dimensions (A, B) relative to the surface of the hollow body (2).

23. Method according to claim 21, wherein parts (11) of the sealing device (4) are displaced over the adapter (3).

24. Method according to claim 21, wherein the cutting tool for making an opening in the hollow body (12) can be moved by means of the sealing device (4) both in the longitudinal direction of the hollow body (12) and also at right angles to this direction.

25. Method according to claim 21, wherein the movement of the cutting tool is performed, in succession, first in one direction (A) and then in a direction (B) at right angles to the first direction (B).

26. Method according to claim 21, wherein, by displacing at least one sliding tube or part-tube of the sealing device (4) along the adapter (3), the working region (9) is exposed, looking from a side of the sliding tube or part-tube remote from the adapter (3).

27. Method according to claim 26, wherein the opening becomes accessible as a result of individual parts (11) of the sealing device (4) being moved apart from one another.

* * * * *